Patented Feb. 1, 1927.

1,616,109

UNITED STATES PATENT OFFICE.

HUGH MILLS BUNBURY, OF MANCHESTER, ENGLAND, ASSIGNOR TO BRITISH DYE-STUFFS CORPORATION LIMITED, OF MANCHESTER, ENGLAND.

PROCESS FOR THE PREPARATION OF AMINO-DIANTHRIMIDES.

No Drawing. Application filed October 17, 1925, Serial No. 63,004, and in Great Britain December 19, 1924.

I have found that the anthraquinone-mono-oxamic acids of the type

NH₂.AQ.NH.CO.COOH, and their salts, (where "AQ" represents a divalent anthraquinone residue) are useful intermediates in the preparation of mono-, di-, etc., aminoanthrimides.

The mono-oxamic acids are readily obtained in excellent yield direct from the diaminoanthraquinones and oxalic acid by methods such as that of the subjoined.

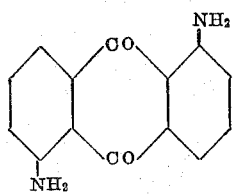  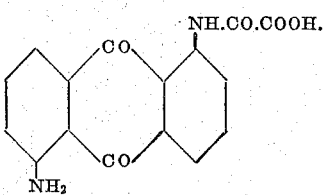

The mono-oxamic acids of 1:4- and 1:8-diamino-anthraquinones, diaminoanthrarufin, diaminochrysazin, etc., may be prepared in a similar manner. In this way one and one only of the two amino groups present is protected or covered, thus leaving the other group free to take part in condensation and other reactions. This is the simplest method available for achieving this useful and important purpose.

These mono-oxamic acids may be made to undergo condensation with halogenated anthraquinones to yield the dianthrimides. During the condensation, the oxalyl group may be converted wholly or in part into the formyl group by loss of carbon dioxide. The formylamino derivatives can, in fact,

Example 1.

10 parts of 1:5-diamino-anthraquinone, 40 parts of crystallized oxalic acid and 20 parts of water are stirred into a stiff paste and maintained at a temperature of about 105–110° C. for 2½ hours, with occasional stirring. Small quantities of water may be added from time to time to compensate for losses by evaporation and keep the amount constant. The product is extracted with hot water. A yield of about 90–95 per cent is obtained. The reactions may be formulated as follows, be prepared by heating the oxamic acids to a suitably high temperature. Hydrolysis of the resulting dianthrimide removes the oxalyl (or formyl) group and other acyl groups which may be present, such as, for example, acetyl, or benzoyl, thus yielding the corresponding amino dianthrimide.

Example 2.

4:5'-diamino-1:1'-dianthrimide may be prepared in the following way:

11.4 parts of 4-benzoylamino-1-chloroanthraquinone, 10 parts of 1:5-diamino-anthraquinone mono-oxamic acid (which may be prepared as described), 3 parts of fused sodium acetate, 0.3 part of copper powder and 100 parts of nitrobenzene are heated for 15 hours at a gentle boil. The product is filtered off at 70–80° C. and well washed with alcohol.

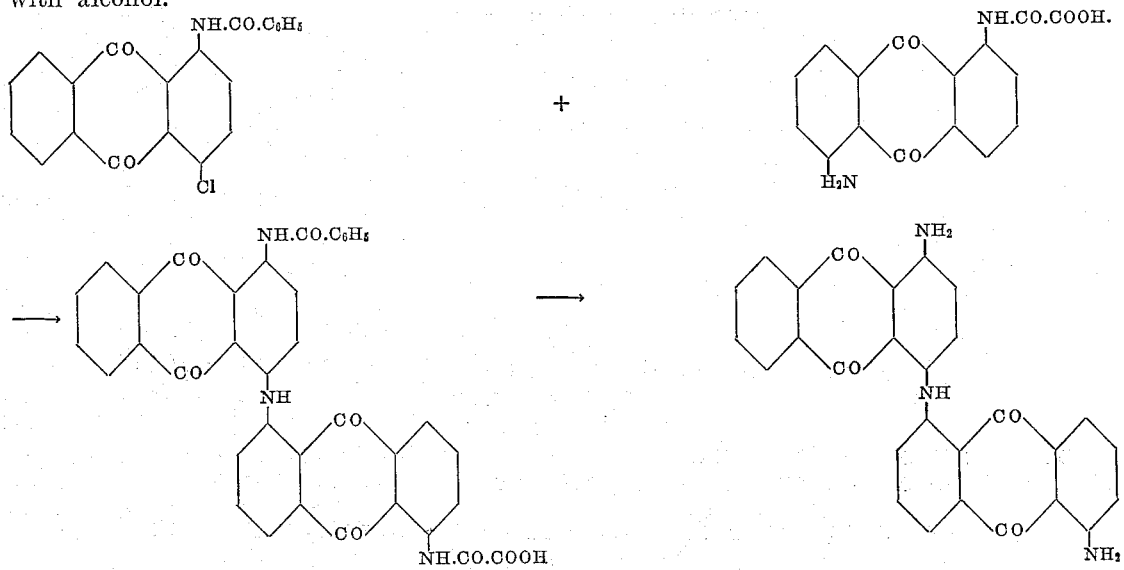

The hydrolysis is carried out by heating the product in twenty times its weight of 70 per cent sulphuric acid at 100° C. for 2½–3 hours.

*Example 3.*

5:5'-diamino-1:1'-dianthrimide may be prepared from 5-benzoylamino-1-chloroanthraquinone and 1:5-diaminoanthraquinone oxamic acid in a manner similar to that described in Example 1.

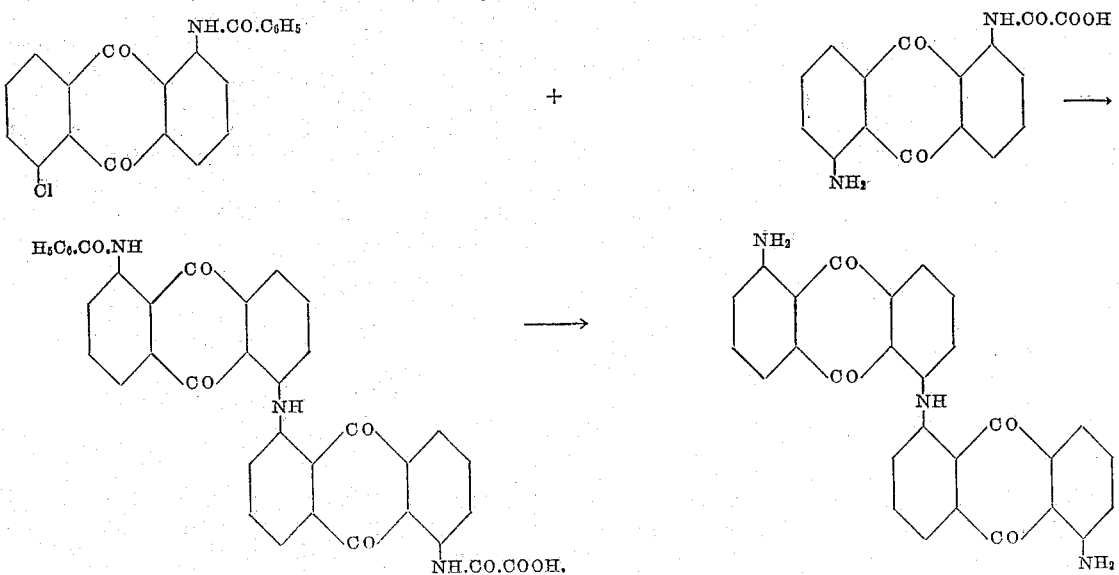

The amino dianthrimides so obtained are valuable intermediates for vat dyestuffs.

The method of making anthraquinone mono-oxamic acids described, I do not herein claim, it forming the matter of another application, Serial No. 103,985, filed April 22, 1926.

I claim—

1. In the manufacture of amino-dianthrimides, the process which comprises condensation of an anthraquinone-mono-oxamic acid of the type $$NH_2.AQ.NH.CO.COOH,$$

wherein "AQ" represents a divalent anthraquinone residue, with halogenated anthraquinones and hydrolysis of the acylamino derivative so obtained.

2. The method of making 4:5'-diamino-1:1'-dianthrimide which comprises condensing 4-benzoylamino-1-chloroanthraquinone with 1:5-diamino-anthraquinone monooxamic acid and hydrolyzing the acylamino derivative so obtained.

In testimony whereof I have hereunto affixed my signature.

HUGH MILLS BUNBURY.